United States Patent [19]

Cotter

[11] Patent Number: 5,065,954
[45] Date of Patent: Nov. 19, 1991

[54] RELEASE MECHANISM

[75] Inventor: Patrick J. Cotter, Plymouth, Mich.

[73] Assignee: TRW Vehicle Safety Systems Inc., Cleveland, Ohio

[21] Appl. No.: 183,651

[22] Filed: Apr. 19, 1988

[51] Int. Cl.⁵ .................. A62B 35/00; B65H 75/48
[52] U.S. Cl. ............................................. 242/107.7
[58] Field of Search ............ 242/107.12, 107.6, 107.7; 280/803, 807; 297/475, 476, 478

[56]     References Cited
U.S. PATENT DOCUMENTS

| | | | |
|---|---|---|---|
| 3,858,826 | 1/1975 | Sprecher | 242/107.7 |
| 4,002,311 | 1/1977 | Fisher et al. | 242/107.7 |
| 4,124,175 | 11/1978 | Cislak | 242/107.7 |
| 4,149,683 | 4/1979 | Fisher et al. | 242/107.7 |
| 4,165,054 | 8/1979 | Collins | 242/107.7 |
| 4,307,853 | 12/1981 | Higbee et al. | 242/107.7 |
| 4,535,973 | 8/1985 | Dorr et al. | 254/323 |

FOREIGN PATENT DOCUMENTS 101857  6/1983  Japan .................. 280/807

*Primary Examiner*—Joseph J. Hail, III
*Attorney, Agent, or Firm*—Tarolli, Sundheim, & Covell

[57]      ABSTRACT

A spindle is supported for rotation in opposite directions about its longitudinal central axis. An end portion of seat belt webbing is secured to the spindle. The belt webbing normally moves parallel to a predetermined plane as the belt webbing is withdrawn from the spindle. The belt webbing moves in a direction transverse to the predetermined plane during the last quarter of a revolution of the spindle as the belt webbing is fully withdrawn from the spindle. The spindle is biased to rotate about its longitudinal central axis in a belt retraction direction to wind the belt webbing onto the spindle. A comfort mechanism has a member which is movable between a first position in which rotation of the spindle in the belt retraction direction is blocked and a second position in which rotation of the spindle in the belt retraction direction is permitted. A release mechanism moves the member of the comfort mechanism to its second position in response to the end portion of the belt webbing moving in the transverse direction relative to the predetermined plane during the last quarter revolution of the spindle as the belt webbing is fully withdrawn from the spindle.

9 Claims, 3 Drawing Sheets

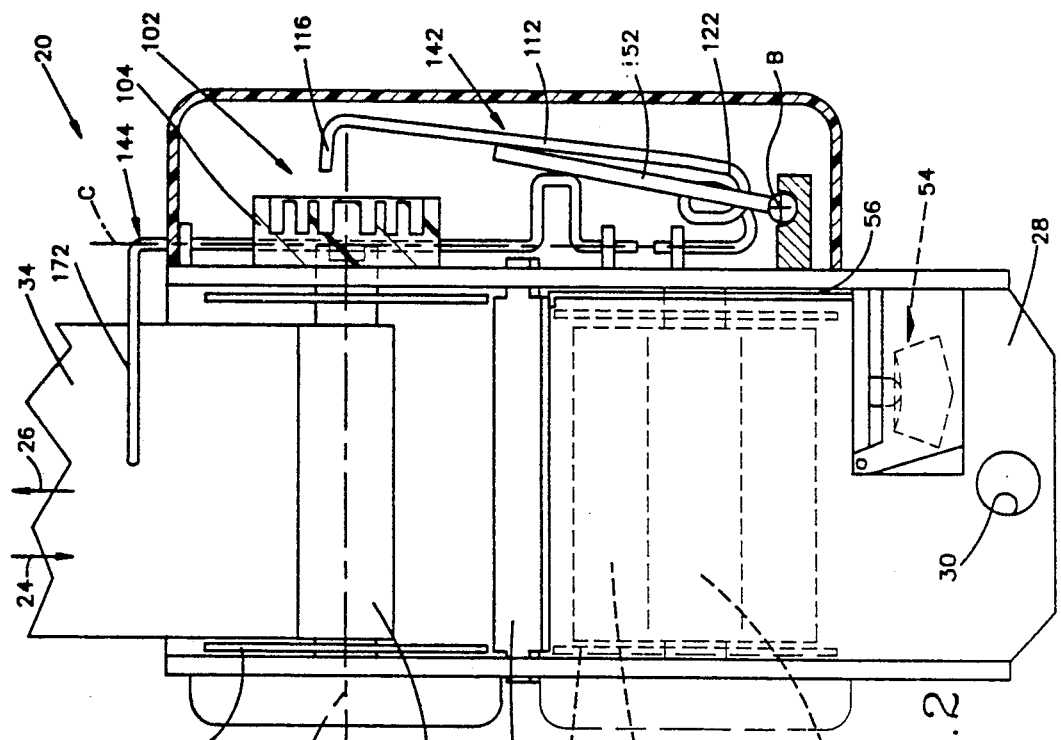
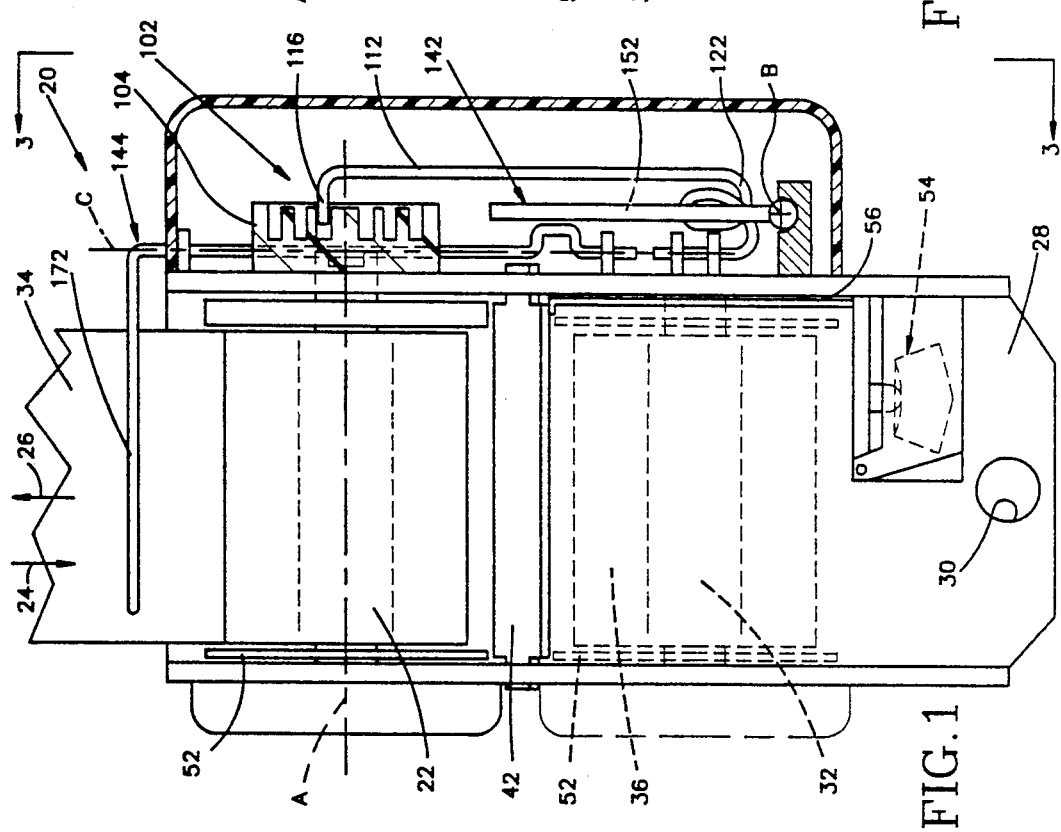

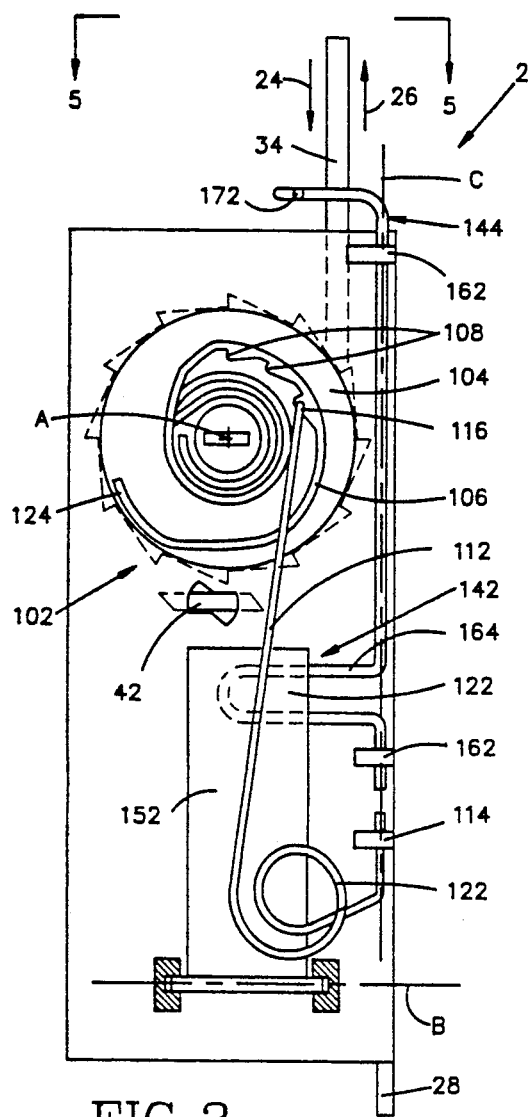
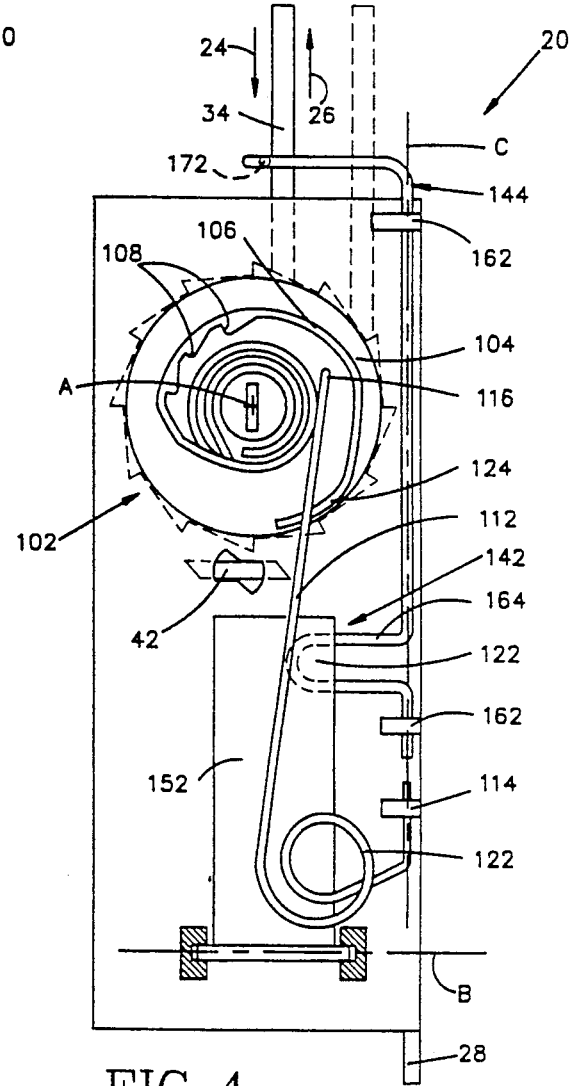
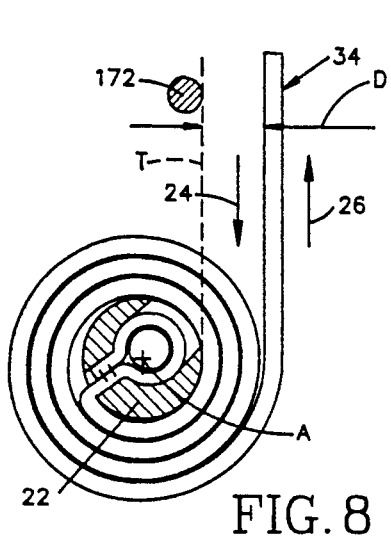
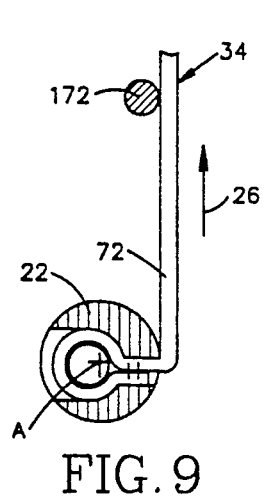
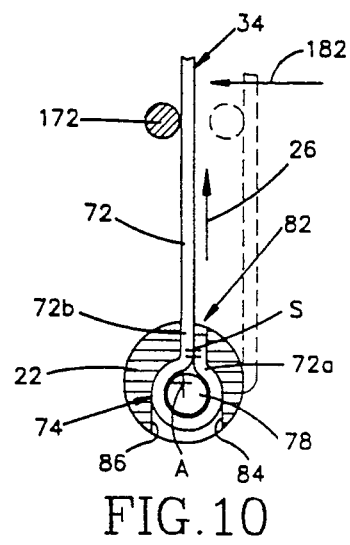
FIG. 3
FIG. 4
FIG. 8
FIG. 9
FIG. 10

RELEASE MECHANISM

BACKGROUND OF THE INVENTION

1. Technical Field

The present invention relates to a vehicle seat belt retractor having a comfort mechanism. In particular, the present invention relates to a release mechanism for deactuating the comfort mechanism.

2. Description of the Prior Art

Seat belt retractors having comfort mechanisms for relieving the force applied by seat belt webbing against a vehicle occupant are known. One such seat belt retractor is disclosed in U.S. Patent No. 4,002,311 and includes seat belt webbing secured to a spindle. The spindle is supported for rotation in belt withdrawal and belt retraction directions. A spring biases the spindle to rotate in the belt retraction direction and pulls the seat belt webbing against the occupant. To relieve the force applied by the belt webbing against the occupant, the occupant establishes slack in the belt webbing and actuates the comfort mechanism to maintain the slack.

The comfort mechanism includes a disk connected to the spindle for rotation with the retractor spindle. A groove having a stop surface is located in an axial end surface of the disk. When the comfort mechanism is actuated, an end portion of a follower engages the stop surface, and blocks rotation of the disk and spindle in the belt retraction direction.

A release mechanism moves the follower out of engagement with the stop surface on the disk to deactuate the comfort mechanism in response to opening of the vehicle door. The comfort mechanism may also be deactuated by withdrawing more than a predetermined amount of belt webbing from the retractor. When more than the predetermined amount of belt webbing is withdrawn, the follower is forced out of the groove in the disk to a position in which the follower no longer engages the stop surface and the comfort mechanism is deactuated. In certain cases, the amount of seat belt webbing which is withdrawn when full extension of the seat belt webbing is reached may be less than the predetermined amount of belt webbing and the comfort mechanism does not deactuate. Thus, it is necessary to open the vehicle door to deactuate the comfort mechanism. Opening the vehicle door may be undesirable, however.

A release mechanism disclosed in U.S. Pat No. 4,149,683 deactuates a comfort mechanism similar to the comfort mechanism of U.S. Pat. No. 4,002,311 in response to full extension of the seat belt webbing. Thus, the above-mentioned problem with the comfort mechanism release of U.S. Pat. No. 4,002,311 is avoided. In U.S. Pat. No. 4,149,683, the seat belt webbing has an end portion looped around the retractor spindle and stitched to another portion of the seat belt webbing. An end surface of the seat belt webbing extends perpendicular to the direction in which the webbing is withdrawn. The end surface of the webbing engages a lever just prior to full extension of the webbing from the spindle. The lever has a portion which engages the follower of the comfort mechanism. As the seat belt webbing is then withdrawn to full extension, the lever is moved by the end surface of the webbing in the direction of belt withdrawal. During movement of the lever, the follower is forced into a position in which the follower does not engage the stop surface on the disk. This deactuates the comfort mechanism.

SUMMARY OF THE INVENTION

A seat belt retractor according to the present invention includes a spindle having a longitudinal central axis. The spindle is supported for rotation in opposite directions about the longitudinal central axis. An end portion of seat belt webbing is secured to the spindle. The spindle is biased to rotate about the longitudinal central axis in a belt retraction direction to wind the belt webbing onto the spindle. Upon withdrawal of the belt webbing, the spindle rotates in an opposite direction about the longitudinal central axis. During the last quarter of a revolution of the spindle just prior to full extension of the belt webbing, the end portion of the belt webbing moves in a direction transverse to the direction of belt webbing withdrawal from a position in which the webbing extends tangentially with respect to the spindle to a position in which the webbing extends radially from the spindle.

The seat belt retractor of the present invention includes a comfort mechanism for blocking rotation of the spindle in the belt retraction direction to prevent the belt webbing from being pulled against the occupant. The comfort mechanism includes a follower which is movable between a first position in which rotation of the spindle in the belt retraction direction is blocked and a second position in which rotation of the spindle in the belt retraction direction is permitted. The follower is moved to the second position by a release mechanism in response to the end portion of the belt webbing moving transversely to the direction of belt webbing withdrawal from the position in which the webbing extends tangentially with respect to the spindle to the position in which the webbing extends radially with respect to the spindle.

The release mechanism includes a lever supported for pivotal movement. The follower is moved to its second position in response to pivotal movement of the lever in one direction. The lever is engaged and pivoted in the one direction by the end portion of the belt webbing during movement of the end portion of the belt webbing in the direction transverse to the direction of the belt webbing withdrawal.

The comfort mechanism preferably used in the retractor of the present invention is similar to the comfort mechanism disclosed in U.S. Pat. No. 4,002,311 and includes a disk connected to and rotatable with the spindle. The disk has a groove and a stop surface. The follower has an end portion which is received in the groove and engages the stop surface to block rotation of the spindle in the belt retraction direction. The end portion of the follower is moved out of engagement with the stop surface when the lever pivots in the one direction.

BRIEF DESCRIPTION OF THE DRAWINGS

Further features of the present invention will become apparent to those skilled in the art to which the present invention relates from reading the following specification with reference to the accompanying drawings, in which:

FIGS. 1 and 2 are front elevational views, partially in section, of a seat belt retractor according to the present invention illustrating parts in different positions;

FIG. 3 is a side view of the retractor of FIG. 1 with parts removed, taken approximately along line 3—3 of FIG. 1;

FIG. 4 is a view similar to FIG. 3 illustrating parts in different positions;

FIGS. 8-10 are views, partly in section, of a spindle and belt webbing, taken approximately along lines 8—8, 9—9, and 10—10 of FIGS. 5, 6 and 7, respectively, illustrating parts in different positions.

DESCRIPTION OF A PREFERRED EMBODIMENT

Figure 5:
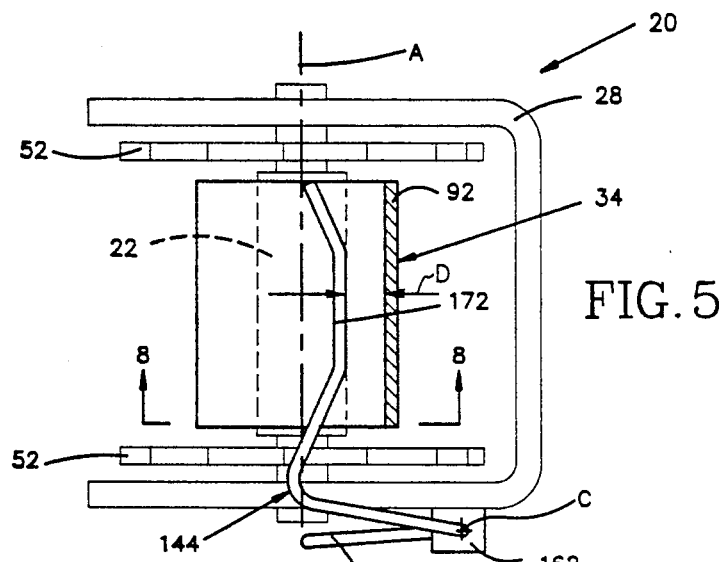
FIG. 5 is a plan view of the retractor of FIG. 3 with parts removed, taken approximately along line 5—5 of FIG. 3.

A seat belt retractor 20 for use in an automotive vehicle is illustrated in FIG. 1. The seat belt retractor 20 includes a spindle 22 having a longitudinal central axis A. Shoulder belt webbing 34 is secured to the spindle 22. The spindle 22 is supported for rotation in a belt retraction direction 24 and a belt withdrawal direction 26 about the longitudinal central axis A by a frame 28. A wind-up spring biases the spindle 22 to rotate in the belt retraction direction 24, as is known. A suitable fastener (not shown) extends through an opening 30 in the frame 28 for connecting the retractor 20 to the vehicle.

The retractor 20 includes a second spindle 32 supported for rotation by the frame 28. Lap belt webbing 36 is secured to the second spindle 32. A locking pawl 42 is supported by the frame 28 for pivotal movement. Locking ratchet wheels 52 are connected to the spindles 22, 32 for rotation with the spindles. A plurality of ratchet teeth extend radially of each of the ratchet wheels 52. An inertia member 54 pivots during an emergency situation, such as a collision, to move a lever 56 upwardly, as viewed in FIG. 1. Movement of the lever 56 pivots the pawl 42 toward the ratchet wheels 52 (clockwise, as viewed in FIG. 3). When the pawl 42 engages the teeth on the ratchet wheels 52, rotation of the spindles 22, 32 in the belt withdrawal direction 26 is blocked, as is known.

The shoulder belt webbing 34 is secured to the spindle 22 by an end portion 72 (FIG. 10) of the webbing. Part 72a of the end portion 72 is formed into a loop 74 and stitched, as indicated at S, to part 72b of the end portion. A rod 78 is inserted into the loop 74. The end portion 72 of the belt webbing 34 is received in and extends from a slot 82 in the spindle 22, as viewed in FIG. 10. The slot 82 has a tapered configuration and is defined by opposed surfaces 84, 86 of the spindle 22. Specifically, the lower portion of the slot 82, as viewed in FIG. 10, is wider, as measured between the surfaces 84 and 86, than the upper portion of the slot. The corresponding width of the loop 74, after receiving the rod 78, is greater than the width of the upper portion of the slot 82 but less than the width of the lower portion of the slot. Thus, when the belt webbing 34 is subjected to a force tending to pull the end portion 72 in a belt withdrawal direction 26, the loop 74 wedges between the surfaces 84, 86.

The seat belt retractor 20 includes a comfort mechanism 102 which, when actuated, blocks rotation of the spindle 22 in the belt retraction direction 24. The comfort mechanism 102, thus, prevents the wind-up spring from pulling the belt webbing 34 against the occupant.

The comfort mechanism 102 is actuated, once the belt webbing 34 is extended about the occupant and buckled, by slightly withdrawing the belt webbing 34 to establish slack and then releasing the belt webbing.

The structure and operation of the comfort mechanism 102 is disclosed in detail in U.S. Pat. No. 4,002,311, which disclosure is fully incorporated herein by reference. The comfort mechanism 102 includes a disk 104 (FIGS. 1 and 3) connected to the spindle 22 for rotation with the spindle. A spiral groove 106 is formed in an axial end surface of the disk 104. The groove 106 has a plurality of surfaces defining hook-shaped stops 108. The comfort mechanism 102 also includes a follower 112 supported by a bearing 114 on the frame 28. An end portion 116 of the follower 112 is receivable in the groove 106. A spring portion 122 of the follower 112 biases the end portion 116 of the follower 112 in a direction generally parallel to the axis A toward the disk 104. The spring portion 122 also biases the end portion 116 of the follower 112 in a direction radially toward the axis A. The spring portion 122 permits the end portion 116 of the follower 112 to move radially outwardly along the groove 106 away from the axis A during rotation of the spindle 22 in the belt retraction direction when the end portion 116 is received in the groove 106.

When the end portion 116 of the follower 112 engages one of the stops 108, rotation of the spindle 22 in the belt retraction direction 24 is blocked. This prevents the wind-up spring from applying a force through the belt webbing 34 and pulling the belt webbing against the occupant. When the end portion 116 of the follower 112 pivots a predetermined amount in a direction away from the disk 104, the end portion 116 moves to a position in which it does not engage one of the stops 108 on the disk 104. The wind-up spring may then rotate the spindle 22 in the belt retraction direction 24.

After the comfort mechanism 102 is actuated, it may be deactuated by withdrawing the belt webbing 34 an amount which is greater than a predetermined amount. Specifically, when more than the predetermined amount of belt webbing 34 is withdrawn, the spindle 22 and disk 104 rotate counterclockwise, as viewed in FIG. 3, and the end portion 116 of the follower 112 is moved out of the groove 106 by travelling up a ramped end portion 124 of the groove 106. The end portion 116 of the follower 112 then moves in a direction toward the axis A to a position in which the end portion of the follower does not engage the groove 106 or stops 108. Thus, the spindle 22 may rotate in the belt retraction direction 24 in response to the bias of the wind-up spring.

If the spindle 22 and disk 104 cannot be rotated more than the predetermined amount before full extension of the belt webbing 34 is reached, the comfort mechanism 102 does not deactuate. To avoid this problem, the comfort mechanism 102 may be deactuated by a release mechanism, similar to that disclosed in U.S. Pat. No. 4,002,311, which operates in response to opening a vehicle door adjacent the retractor 20. However, it is generally undesirable to open a vehicle door if the vehicle is moving. Thus, a release mechanism 142 (FIGS. 1 and 3), according to the present invention, is provided to deactuate the comfort mechanism 102 in response to full extension of the belt webbing 34 from the spindle 22.

The release mechanism 142 includes a lever 144 (FIG. 3) and a plate 152. The lower portion of the plate 152 is supported by the frame 28 for pivotal movement about an axis B, as illustrated in FIGS. 1-4. The upper portion of the plate 152 engages the follower 112 between the end portion 116 and spring portion 122. When the upper portion of the plate 152, as viewed in FIG. 2, pivots outwardly relative to the frame 28, the plate forces the end portion 116 of the follower 112 in a direction away from the disk 104.

Bearings 162 (FIG. 3) on the frame 28 support the lever 144 for pivotal movement about an axis C which is oriented perpendicular to the axis A of the spindle 22. The lever 144 has an arm 164 located near its lower end for engaging the plate 152. Upon pivotal movement of the lever 144 in the direction 166 about the axis C, as viewed in FIG. 7, the arm 164 pivots away from the frame 28. The arm 164 engages the plate 152 and forces the plate to pivot about the axis B outwardly from the frame 28.

Figure 6:
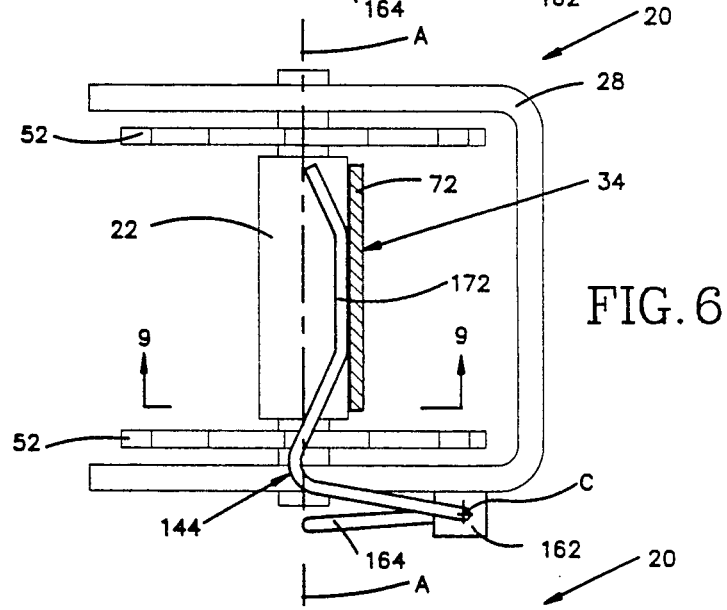
FIGS. 6 and 7 are views similar to FIG. 5 illustrating parts in different positions.

In order to pivot the arm 164 of the lever 144 in the direction 166 about axis C, a belt engaging portion 172 (FIGS. 1, 3 and 5) is provided at an upper end of the lever 144. The belt engaging portion 172 of the lever extends transversely with respect to the belt webbing 34. The belt engaging portion 172 is also located adjacent a plane T (FIG. 8) that extends (a) tangentially from an axially extending line on the outer circumference of the spindle 22 nearest to the belt webbing 34 being withdrawn from the spindle and (b) parallel to the belt webbing withdrawn from the spindle. As illustrated in FIGS. 3, 5 and 8, when most of the belt webbing 34 is wound onto the spindle 22 in the stored condition, the free end of the belt webbing extends tangentially with respect to the spindle but is spaced away from the outer circumference of the spindle and the portion 172 of the lever 144 by a distance D (FIGS. 5 and 8). The distance D represents the radial thickness of the belt webbing 34 wound on the spindle 22. When substantially all of the belt webbing 34 has been withdrawn from the spindle 22, the end portion 72 of the shoulder belt webbing 34 extends tangentially from and is in contact with the outer circumference of the spindle 22, as illustrated in FIGS. 6 and 9. The end portion 72 of the belt webbing 34 then lies in the plane T and engages the belt engaging portion 172 of the lever 144.

As the belt webbing 34 is withdrawn further from the spindle 22, from the position illustrated in FIG. 9 to the fully extended position illustrated in FIG. 10, the spindle rotates 90 degrees or one quarter of a revolution. During this last 90 degrees or one quarter of a revolution of the spindle 22, the end portion 72 of the belt webbing 34 moves in a direction 182 (FIG. 10) transverse to the direction in which the belt webbing extends from the spindle. During this transverse movement, the end portion 72 of the belt webbing 34 moves from a position in which it extends tangentially with respect to the spindle 22, as illustrated in FIG. 9, to a position in which it extends radially from the spindle, as illustrated in FIG. 10.

Figure 7:
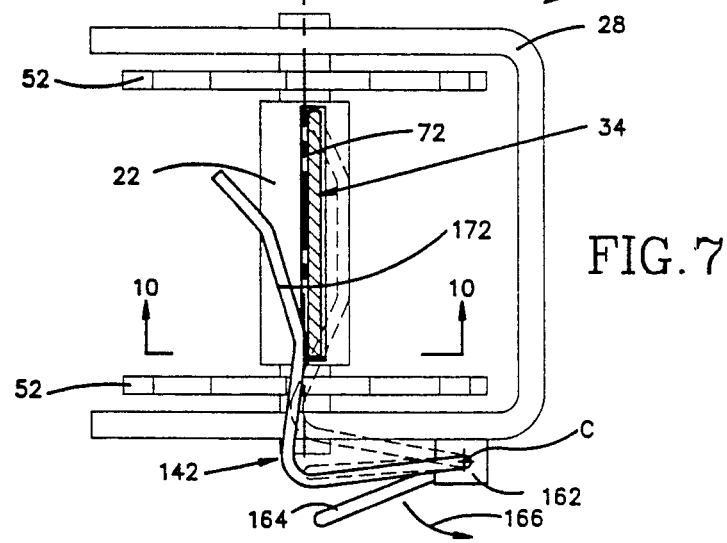

During its transverse movement, the end portion 72 of the belt webbing 34 moves the belt engaging portion 172 of lever 144 in the direction 182 from the position illustrated in FIGS. 6 and 9 to the position illustrated in FIGS. 7 and 10. Movement of the belt engaging portion 172 of the lever 144 in the direction 182 pivots the lever 144 in the direction 166 (FIG. 7) about the axis C. The arm 164 of the lever 144 forces the plate 152 to pivot about the axis B away from the frame 28, which forces the end portion 116 of the follower 112 away from the disk 104 to a position disengaged from the disk. The disk 104 and spindle 22 are then free to rotate in the belt retraction direction 24 and the wind-up spring retracts the belt webbing 34 onto the spindle 22. Thus, upon full extension of the belt webbing 34 from the retractor 20, the comfort mechanism 102 is deactuated without opening the door of the vehicle.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, I claim:

1. An apparatus comprising:
    a spindle having a longitudinal central axis and rotatable in opposite directions about its longitudinal central axis;
    means for securing an end portion of belt webbing to said spindle such that the belt webbing normally moves parallel to a predetermined plane as the belt webbing is withdrawn from said spindle and the belt webbing moves in a direction transverse to the predetermined plane during the last quarter of a revolution of said spindle as the belt webbing is fully withdrawn from the spindle;
    means for biasing said spindle to rotate about its longitudinal central axis in a belt retraction direction to wind the belt webbing onto said spindle;
    means for blocking rotation of said spindle in the belt retraction direction, said blocking means including a member which is movable between a first position in which rotation of said spindle in the belt retraction direction is blocked and a second position in which rotation of said spindle in the belt retraction direction is permitted; and
    means for moving said member to its second position in response to the end portion of the belt webbing moving in the transverse direction relative to the predetermined plane during the last quarter of a revolution of said spindle as the belt is fully withdrawn from said spindle.

2. The apparatus set forth in claim 1 wherein said means for moving said member to its second position comprises a lever supported for pivotal movement, said lever including a first portion for moving said member to its second position in response to pivotal movement of said lever in one direction and a second portion for engaging the end portion of the belt webbing during movement of the belt webbing in the transverse direction relative to the predetermined plane to pivot the lever in the one direction and cause said first portion of said lever to move said member to its second position.

3. The apparatus set forth in claim 1 wherein said securing means comprises a surface defining a slot extending radially through said spindle, the end portion of the belt webbing being received and secured in the slot and extending from the slot.

4. An apparatus comprising:
    a spindle supported for rotation in opposite directions;
    means for securing belt webbing to said spindle;
    means for biasing said spindle to rotate in a belt retraction direction to wind the belt webbing onto said spindle, said belt webbing being in a plane extending tangentially with respect to said spindle when said belt webbing is wound on said spindle and moving to a plane extending radially from said spindle when said belt webbing is fully unwound from said spindle;

means for blocking rotation of said spindle in the belt retraction direction, said blocking means including a member movable between a first position in which rotation of said spindle in the belt retraction direction is blocked and a second position in which rotation of said spindle in the retraction direction is permitted; and means for moving said member to its second position in response to said belt webbing moving to the plane extending radially from said spindle.

5. The apparatus set forth in claim 4 wherein said means for moving said member to its second position comprises a lever supported for pivotal movement, said lever including a first portion for moving said member to its second position in response to pivotal movement of said lever in one direction and a second portion for engaging the belt webbing to pivot the lever in the one direction causing said first portion to move said member to its second position during movement of the belt webbing to the plane extending radially from said spindle.

6. The apparatus set forth in claim 4 wherein said securing means includes a surface defining a slot extending radially through said spindle, the belt webbing having a portion received and secured in the slot and extending from the slot.

7. The apparatus set forth in claim 4 wherein said means for securing belt webbing to said spindle comprises means for moving said belt webbing extending from said spindle from the plane extending tangentially with respect to said spindle to the plane extending radially from said spindle during the last quarter of a revolution of said spindle prior to the belt webbing fully unwinding from said spindle.

8. An apparatus comprising:

a spindle having a longitudinal central axis and rotatable in opposite directions about its longitudinal central axis;

means for securing an end portion of belt webbing to said spindle such that the belt webbing normally moves parallel to a predetermined plane as the belt webbing is withdrawn from said spindle and the belt webbing moves in a direction transverse to the predetermined plane during the last quarter of a revolution of said spindle as the belt webbing is fully withdrawn from said spindle;

means for biasing said spindle to rotate about its longitudinal central axis in a belt retraction direction to wind the belt webbing onto said spindle;

means for blocking rotation of said spindle in the belt retraction direction, said blocking means including a member which is movable between a first position in which rotation of said spindle in the belt retraction direction is blocked and a second position in which rotation of said spindle in the belt retraction direction is permitted; and means for moving said member to its second position in response to the end portion of the belt webbing moving in the transverse direction relative to the predetermined plane during the last quarter of a revolution of said spindle as the belt is fully withdrawn from said spindle;

said means for moving said member to its second position comprising a lever supported for pivotal movement, said lever including a first portion for moving said member to its second position in response to pivotal movement of said lever in one direction and a second portion for engaging the end portion of the belt webbing during movement of the belt webbing in the transverse direction relative to the predetermined plane to pivot the lever in the one direction and cause said first portion of said lever to move said member to its second position;

said blocking means further including a disk connected to and rotatable with said spindle and having surface means defining a groove and a stop, a follower having an end portion receivable in said groove and engageable with said stop to block rotation of said spindle in the belt retraction direction, and a plate member supported for pivotal movement, said plate member being engageable by said first portion of said lever to pivot and move said end portion of said follower out of engagement with said stop in response to said lever pivoting in the one direction.

9. An apparatus comprising:

a spindle supported for rotation in opposite directions;

means for securing the belt webbing to said spindle;

means for biasing said spindle to rotate in a belt retraction direction to wind the belt webbing onto said spindle, said belt webbing being in a plane extending tangentially with respect to said spindle when said belt webbing is wound on said spindle and moving to a plane extending radially from said spindle when said belt webbing is fully unwound from said spindle;

means for blocking rotation of said spindle in the belt retraction direction, said blocking means including a member movable between a first position in which rotation of said spindle in the belt retraction direction is blocked and a second position in which rotation of said spindle in the retraction direction is permitted; and means for moving said member to its second position in response to said belt webbing moving to the plane extending radially from said spindle;

said means for moving said member to its second position comprising a lever supported for pivotal movement, said lever including a first portion for moving said member to its second position in response to pivotal movement of said lever in one direction and a second portion for engaging the belt webbing to pivot the lever in the one direction causing said first portion to move said member to its second position during movement of the belt webbing to the plane extending radially from said spindle;

said blocking means further including a disk connected to and rotatable with said spindle and having surface means defining a groove and a stop, a follower having an end portion receivable in said groove and engageable with said stop to block rotation of said spindle in the belt retraction direction, and a plate member supported for pivotal movement, said plate member being engageable by said first portion of said lever to pivot and move said end portion of said follower out of engagement with said stop in response to said lever pivoting in the one direction.

* * * * *